Figure 1:
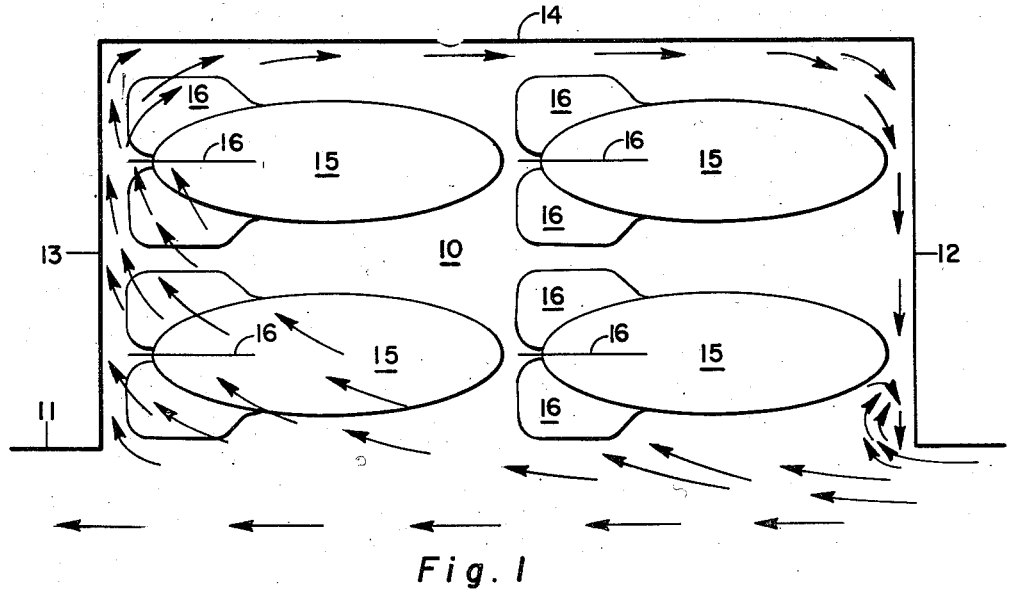

May 7, 1957 L. C. WEINBERG 2,791,387
AIRCRAFT HAVING BOMB BAY AIR FLOW CONTROL APPARATUS
Filed June 29, 1954 3 Sheets-Sheet 1

INVENTOR
LOWELL C. WEINBERG

BY
ATTORNEY

May 7, 1957  L. C. WEINBERG  2,791,387
AIRCRAFT HAVING BOMB BAY AIR FLOW CONTROL APPARATUS
Filed June 29, 1954  3 Sheets-Sheet 2

INVENTOR
LOWELL C. WEINBERG
BY
ATTORNEY

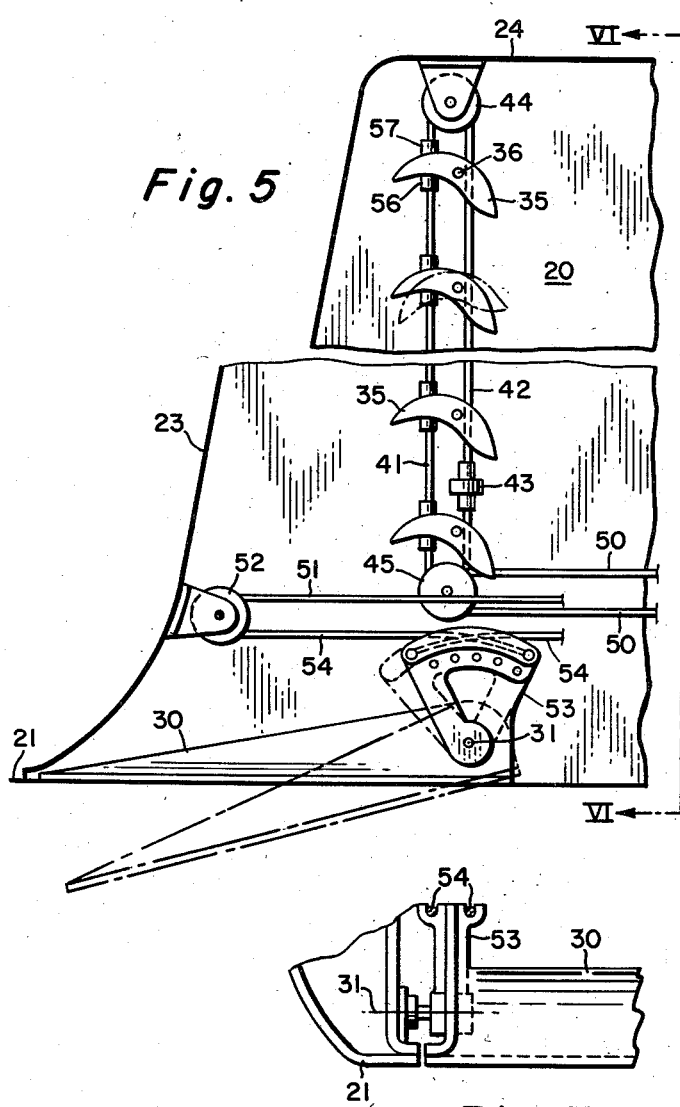
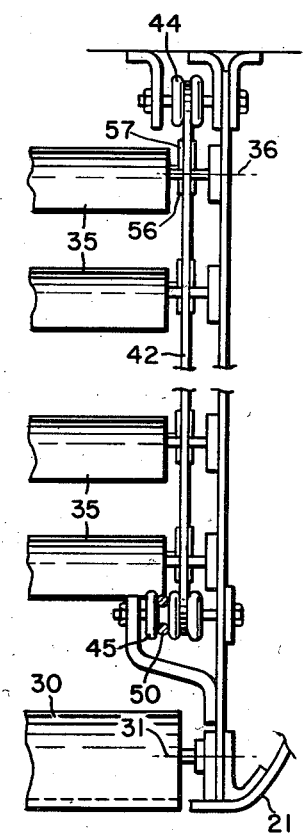
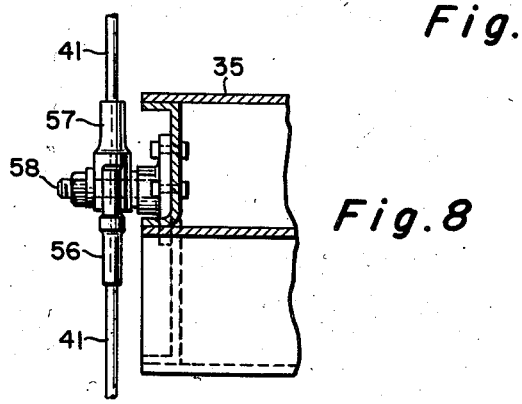

United States Patent Office 2,791,387
Patented May 7, 1957

2,791,387

AIRCRAFT HAVING BOMB BAY AIR FLOW CONTROL APPARATUS

Lowell C. Weinberg, Redondo Beach, Calif.

Application June 29, 1954, Serial No. 440,297

5 Claims. (Cl. 244—137)

(Granted under Title 35, U. S. Code (1952), sec. 266)

The invention described herein may be manufactured and used by or for the Government of the United States of America for governmental purposes without the payment of any royalties thereon or therefor.

The present invention relates to an air flow control apparatus and more particularly to air flow control apparatus employing a plurality of deflecting vanes and a closure means positioned adjacent the rear wall of a cavity in a body means for controlling and directing the air stream in the cavity.

The present invention is adapted to be utilized in controlling the flow of air in a cavity formed in the body of any type of vehicle or other structure. It is often desirable to control the air stream entering a cavity so as to prevent circulation of the air therein in such a manner that it may produce disturbing forces on articles stored or contained in the cavity and which are released or jettisoned therefrom.

Due to the high speeds of modern aircraft, the problem of controlling the attitude of bombs leaving the aircraft bomb bay has become critical. The air flow in the bomb bay of modern aircraft tends to cause the bombs to pitch and tumble when released, thereby affecting the trajectory of the bombs and destroying the bombing accuracy. The present invention is particularly adapted for controlling the air flow in bomb bays to insure that the bombs are in the proper attitude after release within the bomb bay and upon emergence from the bomb bay.

Conventional bomb bays in the fuselage of airplanes are provided with doors on the bottom thereof which usually open along the center line of the bomb bay and are hinged at the outer edges thereof. When these doors are open, a portion of the air flowing past the fuselage enters the bomb bay and is compressed against the rear wall of the bomb bay. Due to this compression, the air travels upward with considerable velocity and force along the rear wall of the bomb bay, and thence travels around the inside of the bomb bay in a turbulent motion. Such turbulence within the bomb bay creates forces which act upon the bombs and their associated fins, and consequently when the bombs are released they do not fall in the proper attitude which they would assume if acted upon only by the force of gravity.

The present invention utilizes a plurality of deflecting vanes, a space for the travel of the deflected air, and a closure means positioned adjacent the rear wall of the bomb bay such that the air entering the bomb bay is deflected downwardly to the rear of the bomb bay and drawn out of the bomb bay compartment, thereby preventing the air from whirling about the bomb bay and creating turbulence therein. In this manner, the air flow within the bomb bay is prevented from adversely affecting the attitude of the bombs upon release thereby ensuring that the bombs will take the proper trajectory.

An object of the present invention is the provision of a new and novel air flow control apparatus which substantially prevents the air stream entering a cavity in the body means from creating turbulence therein.

A further object is to provide an air flow control apparatus which is simple and inexpensive in construction yet sturdy and efficient in operation.

Figure 2:
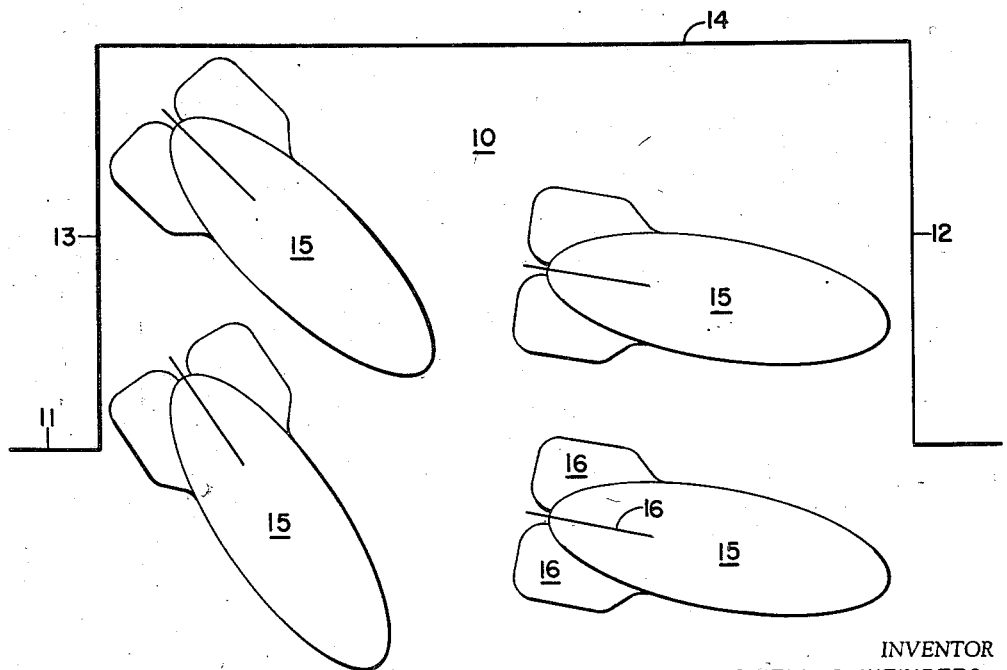
Figure 3:
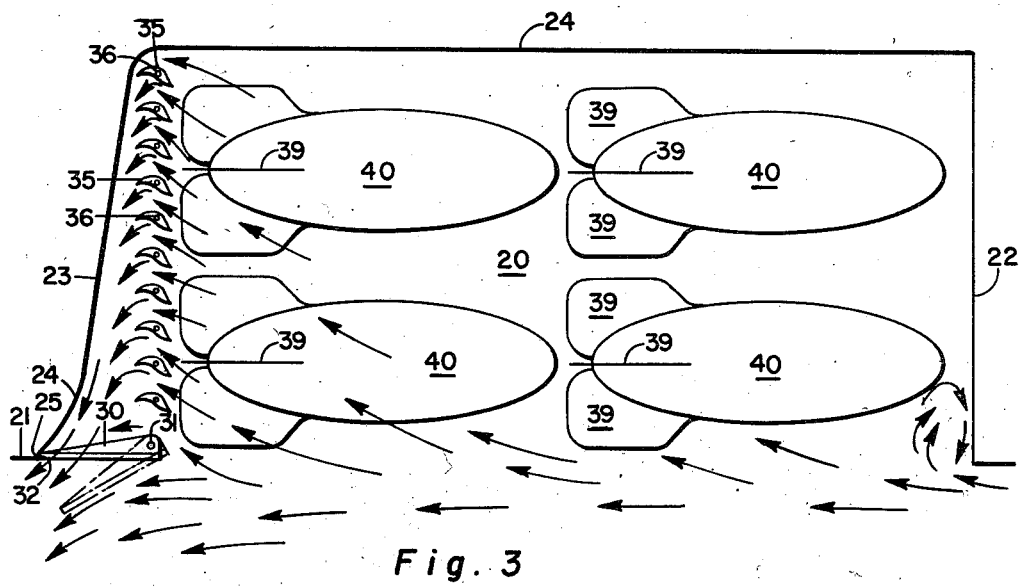
Figure 4:
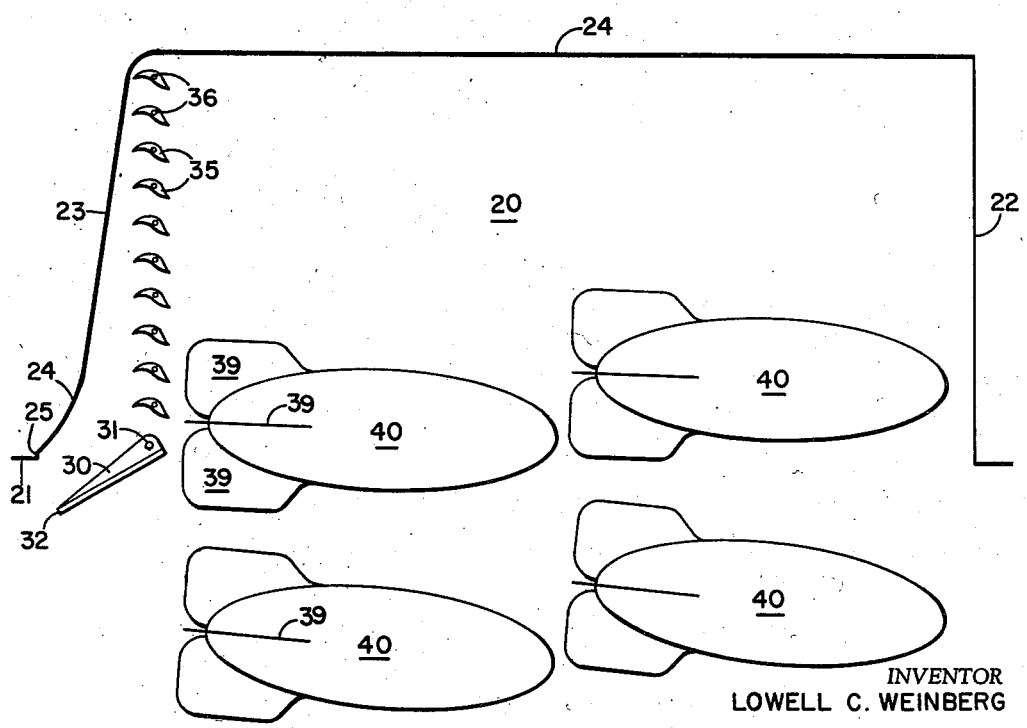

Other objects and many of the attendant advantages of this invention will be readily appreciated as the same becomes better understood by reference to the following detailed description when considered in connection with the accompanying drawings wherein:

Fig. 1 shows a longitudinal section of a conventional bomb bay with a plurality of bombs positioned therein, and illustrates the flow of air within the bomb bay, Fig. 2 shows the position assumed by the bombs of Fig. 1 subsequent to release thereof, Fig. 3 shows a longitudinal section of a preferred embodiment of the present invention illustrating the flow of air therein, Fig. 4 illustrates the position assumed by the bombs shown in Fig. 3 subsequent to release thereof, Fig. 5 is an enlarged side elevation view of the deflecting vanes and closure door illustrating the actuating means, Fig. 6 is a partial front elevation view taken along line VI—VI of Fig. 5, Fig. 7 is a similar partial front elevation of the closure door and cable attaching means, and Fig. 8 is an enlarged sectional view of the vane cable attaching means.

Referring now to the drawings wherein like reference characters designate like or corresponding parts throughout the several views, there is shown in Fig. 1 a prior art bomb bay 10 formed in the outer periphery 11 of the fuselage of a conventional aircraft. The bomb bay has a forward wall 12, a rearward wall 13, and an upper wall 14, the hinged doors which close the bomb bay not being shown for the purpose of illustration. Four bombs 15 having guide fins 16 thereon are disposed within the bomb bay, and the means for retaining and releasing the bombs are not shown for the purpose of illustration.

The arrows in Fig. 1 illustrate the direction of flow of air in the bomb bay when the bomb bay doors are open. It may be noted that fins 16 of the bombs positioned adjacent the rear wall 13 of the bomb bay receive a considerable upward force from the air which flows upward along wall 13. It may also be noted that a downward force is exerted on the nose of the bombs installed adjacent wall 12 of the bomb bay.

Referring to Fig. 2 which shows the position of the bombs just subsequent to release thereof, it may be seen that the air flow upward along wall 13 tends to restrain or lift the rear end of the bombs adjacent wall 13 as the center and nose portion of the bombs falls due to the force of gravity. This action of the air causes the bombs to rotate about their center of gravity and pitch forward whereby upon entering the exterior air stream the bombs are pitched violently downward and to the rear by the rearward acting force of the airstream. This is a very undesirable result which seriously effects the accuracy of bombing. It should also be noted that to a lesser degree, the air flow acting downwardly on the nose of the bombs positioned adjacent wall 12 causes these bombs to enter the exterior air stream in an improper position.

Referring to Fig. 3 which shows a preferred embodiment of the invention, a bomb bay 20 formed in the outer periphery 21 of the fuselage has a forward wall 22, a rearward wall 23 and an upper wall 24. Wall 23 slopes downwardly and rearwardly of the direction of flight of the aircraft, and a portion 24 thereof is curved rearwardly to form a shoulder 25 between the curved portion and the outer periphery of the fuselage. A door or closure means 30 is pivoted about an axis 31 which is horizontal and perpendicular to the longitudinal axis of the aircraft, the door being normally in a closed position as shown in full lines with the trailing edge 32 thereof juxtaposed with shoulder 25. A plurality of deflecting vanes 35 are pivotally mounted about axes 36 which are parallel to axis 31, the vanes extending substantially from one lateral wall of the bomb bay to the opposite lateral wall thereof. The vanes are suitably connected to move in tandem and means described with reference to Figs. 5–8 are provided for selectively actuating door 30 and vanes 35 either independently or simultaneously as desired.

The direction of flow of air within the bomb bay when the aircraft is in motion is indicated by the arrows in Fig. 3, and as indicated in phantom lines, door 30 is lowered as shown when the bomb bay doors are open. It may be noted that vanes 35 have an aerodynamic configuration which causes the air flow to be deflected rearwardly and downwardly along sloping wall 23, and thence through the opening between curved portion 24 and door 30. When door 30 is opened, the exterior air stream is deflected downward as indicated by the arrows, thereby creating suction in the opening between wall portion 24 and door 30 which draws the air down along wall 23 and out of the bomb bay.

It should be noted that the air flow in bomb bay 20 is prevented from rising sharply at the rear of the bomb bay and the direction of air flow is nearly parallel to the horizontal fins 39 of bombs 40 which are located at the rear of the bomb bay. In this manner, the air flow is prevented from creating large forces which tend to restrain or lift the tail portion of these bombs. It is further noted that the air traveling upward at the rear of the bomb bay is prevented from whirling about and traveling forward within the bomb bay to thereby create a downward force on the nose of bombs 40 located adjacent the forward end of the bomb bay. A smoother air flow is thereby ensured within the bomb bay, substantially eliminating turbulence and disturbing forces on the bombs.

Fig. 4 illustrates the position of the bombs shown in Fig. 3 subsequent to release thereof, and it is seen that the bombs leave the bomb bay in a substantially horizontal attitude which ensures that the bombs will take the proper trajectory, thereby increasing the bombing accuracy. The operation of the invention apparatus has been described for the purpose of illustration with a plurality of bombs positioned within the bomb bay. It should be understood, however, that a similar action and effect will occur when only a single large bomb is positioned within the bomb bay or when a greater number of bombs than shown are positioned therein. Although it is considered preferable to employ a plurality of vanes 35, it should be understood that a single vane may be employed and that the vanes may be fixed in position within the bomb bay.

In Figs. 5–8 are shown suitable means for actuating deflecting vanes 35 and door 30. Vanes 35 are each pivotally mounted about their respective axis 36 to the side walls of bomb bay 20 and being connected to each other by pivotally mounted cable assemblies 41 more fully described hereinafter with reference to Fig. 8. The top and bottom vanes are connected to each other by means of a balance cable 42 which passes over pulleys 44 and 45 mounted adjacent the top and bottom of bomb bay 20, cable 42 being connected to cable assemblies 41 through a turnbuckle 43 for tension adjustment. Pulley 45 is a double pulley, one pulley accommodating vertically extending cable 42 and the other pulley accommodating a horizontal actuating cable 50 suitably controlled by a control lever or the like available to the aircraft crew member. A pulling force on cable 50 in either direction rotates deflecting vanes 35 in unison in a corresponding direction from the position shown in solid lines to the position shown by one of the vanes in broken lines.

Closure door 30 pivotally mounted in the bomb bay about axis 31 is also controlled by a cable system consisting of a pair of cable quadrant 53 integrally mounted to one end of door 30, and a pair of horizontal cables 51 and 54 passing around an anchor pulley 52 and controlled by the aircraft crew. Two ends of cable 54 are so anchored to the two quadrants that a pulling force in one direction pivots door 30 to a closed position shown in solid lines, and a pulling force in the opposite direction pivots door 30 to an open position shown in broken lines.

In Fig. 8 is shown the details of each cable assembly 41 having oppositely disposed male and female terminal fittings, 56 and 57 respectively, the male and female fittings of adjacent assemblies rotatably mounted on a stud shaft 58 mounted to the vane 35.

As pointed out previously, the invention device is adapted to be employed to control the flow of air within a cavity in any vehicle or structure, such as automobiles or railroad cars.

From the foregoing, it is evident that there is provided a new and novel air flow control apparatus which is adapted to prevent turbulent and undesirable air flow in a cavity in a body member and which is simple and inexpensive in construction, yet sturdy and efficient in operation.

Obviously many modifications and variations of the present invention are possible in the light of the above teachings. It is therefore to be understood that within the scope of the appended claims the invention may be practiced otherwise than as specifically described.

I claim:

1. Air flow control apparatus which comprises a body means adapted to move relative to an airstream, said body means having a forward and a rear portion and an upper and a lower portion, said body means also having a cavity formed in the outer periphery thereof, said cavity having a rear wall sloping rearwardly of said body means, deflecting means disposed adjacent said rear wall for deflecting the airstream downward relative to said body means along said wall, and closure means for a portion of said cavity pivotally mounted adjacent said deflecting means, and means for adjusting the position of said closure means for controlling the flow of the deflected airstream.

2. Air flow control apparatus which comprises a body means adapted to move relative to an airstream, said body means having a forward and a rear portion and an upper and a lower portion, said body having a cavity formed in the outer periphery thereof, said cavity having a rear wall which slopes downwardly and rearwardly of said body means, deflecting means positioned adjacent said wall and comprising a plurality of vanes adapted to deflect an airstream in said cavity rearwardly and downwardly with respect to said body means, and closure means for a portion of said cavity pivotally mounted adjacent said deflecting means, the rear edge of said closure means being adapted to be juxtaposed with the outer periphery of said body means.

3. Apparatus as defined in claim 2 wherein said vanes are pivotally mounted and means is provided for adjusting the position of said vanes.

4. Air flow control apparatus which comprises a body means having a longitudinal axis and being adapted to move relative to an airstream, said body means having a forward and a rear portion and an upper and a lower portion, said body having a cavity formed in the outer periphery thereof, said cavity having a rear wall which slopes downwardly and rearwardly of said body means, a plurality of spaced deflecting vanes pivotally mounted adjacent said wall, the axes of rotation of said vanes being substantially perpendicular to the longitudinal axis of said body means, means for adjusting the position of said vanes, closure means for a portion of said cavity pivotally mounted adjacent said deflecting means, and means for adjusting the position of said closure means.

5. In an aircraft, a fuselage having a bomb bay formed therein, said fuselage having a longitudinal axis, said bomb bay having a forward and a rear wall, side walls connecting corresponding lateral portions of said forward and rear walls, the rear wall of said bomb bay sloping downwardly and rearwardly of said fuselage, a plurality of spaced deflecting vanes pivotally mounted adjacent said rear wall and extending laterally substantially from one side wall to the other side wall of said bomb bay, the axes of rotation of said vanes being substantially perpendicular to the longitudinal axis of said fuselage, means for adjusting the position of said vanes, closure means for a portion of said bomb bay pivotally mounted adjacent said deflecting means, and means for adjusting the position of said closure means.

References Cited in the file of this patent

UNITED STATES PATENTS

| | | |
|---|---|---|
| 2,076,259 | Wright | Apr. 6, 1937 |
| 2,427,987 | Wilson | Sept. 23, 1947 |
| 2,453,869 | Slate | Nov. 16, 1948 |
| 2,470,120 | Walker | May 17, 1949 |